United States Patent [19]
Girvin

[11] Patent Number: 4,939,950
[45] Date of Patent: Jul. 10, 1990

[54] HANDLEBAR ASSEMBLY FOR CYCLES

[75] Inventor: Robert H. Girvin, Holliston, Mass.

[73] Assignee: K G Engineering, Inc., Woonsocket, R.I.

[21] Appl. No.: 261,556

[22] Filed: Oct. 24, 1988

[51] Int. Cl.⁵ .............................................. B62K 21/14
[52] U.S. Cl. .................................. 74/551.2; 280/279; 280/288.4; 74/551.1
[58] Field of Search ................. 74/551.1, 551.2, 551.3; 280/279, 276, 278, 288.4; D12/111, 112, 107

[56] References Cited

U.S. PATENT DOCUMENTS

| | | |
|---|---|---|
| 367,368 | 8/1887 | Copeland ........................ 74/551.2 |
| 586,493 | 7/1897 | Hicks . |
| 617,565 | 1/1899 | Deans . |
| 690,464 | 1/1902 | Sadler . |
| 1,053,150 | 2/1913 | Bouillat . |
| 1,468,835 | 9/1923 | Rosen . |
| 2,294,839 | 9/1942 | Duffy ............................ 74/551.2 |
| 2,358,737 | 9/1944 | Schwinn ....................... 74/551.2 |
| 2,396,041 | 3/1946 | Du Pont . |
| 2,583,947 | 1/1952 | Keetch ......................... 74/551.2 |
| 4,379,567 | 4/1983 | Ribi ................................. 280/279 |
| 4,383,388 | 5/1983 | Suimon ....................... 280/279 X |

FOREIGN PATENT DOCUMENTS

| | | | |
|---|---|---|---|
| 53602 | 9/1937 | Denmark ........................ 74/551.2 |
| 1050197 | 1/1954 | France .............................. 74/551.2 |
| 9603 | of 1903 | United Kingdom ............ 74/551.2 |
| 419336 | 11/1934 | United Kingdom ............ 74/551.2 |
| 437984 | 11/1935 | United Kingdom ............ 74/551.2 |
| 531716 | 1/1941 | United Kingdom ............ 74/551.2 |

Primary Examiner—Vinh T. Luong
Attorney, Agent, or Firm—Salter & Michaelson

[57] ABSTRACT

A handlebar assembly for a cycle includes a column member which is securable to a cycle so that it is rotatable about the steering column axis thereof, a pivot arm which is pivotably mounted on the column member so that it extends forwardly therefrom, a spring assembly for resiliently resisting pivoting movement of the pivot arm and a handlebar element of the forward end of the pivot arm. The handlebar element is adapted and mounted so that the hands of an operator of the cycle are positioned forward of the steering column axis, and the spring assembly is operative for resiliently resisting pivoting movement of the pivot arm to cushion shocks which are transmitted to the column member when bumps are encountered in an irregular roadway or off-road surface.

24 Claims, 3 Drawing Sheets

HANDLEBAR ASSEMBLY FOR CYCLES

BACKGROUND AND SUMMARY OF THE INVENTION

The instant invention relates to cycles and more particularly to a handlebar assembly which is adapted to cushion shocks which are transmitted to an operator of a cycle, such as a bicycle, when bumps are encountered in a roadway or off-road surface.

The concept of adapting a handlebar assembly to cushion or dampen shocks which are transmitted to the operator of a cycle when bumps or other irregularities are encountered in a roadway or off-road surface has been generally known for a number of years. In this connection, the devices disclosed in the U.S. Pat. No. 367,368 to COPELAND; U.S. Pat. No. 586,493 to HICKS; U.S. Pat. No. 617,565 to DEANS; U.S. Pat. No. 690,464 to SADLER; U.S. Pat. No. 1,053,150 to BOUILAT; U.S. Pat. No. 1,468,8335 to ROSEN: and 2,396,041 to DuPONT, all disclose handlebar assemblies of this general type and represent the closest prior art to the subject invention of which the applicant is aware. However, since these references fail to disclose or suggest the novel concepts and structural features of the handlebar assembly of the subject invention, they are believed to be of only general interest with respect thereto as will hereinafter be made apparent.

Recently, it has been found that the maneuverability of a bicycle can be enhanced by adapting the bicycle so that the weight of the upper body of an operator thereof is moved forwardly over the front wheel of the bicycle. It has been found that this can be accomplished by adapting the handlebar assembly of the bicycle to position the handlebar element thereof well forward of the steering column and by utilizing a substantially straight handlebar element so that an operator's hands are normally positioned forward of the steering column. However, it has not been possible to adapt a handlebar assembly of this type to absorb shocks which are caused by bumps in irregular roadway or off-road surfaces utilizing the heretofore known technology.

The instant invention effectively solves the problem of providing a shock absorbing handlebar assembly for a bicycle which is operative for positioning the hands of an operator forward of the steering column of the cycle. Specifically, the handlebar assembly of the instant invention comprises a column member which is adapted to be rotatably mounted on a cycle, such as a bicycle, along the steering column axis thereof, a pivot arm and means for mounting the pivot arm so that it extends forwardly from the column member and so that it is downwardly pivotable about a pivot axis which is substantially perpendicular to the axis of the steering column. The handlebar assembly further comprises means for resiliently resisting pivoting movement of the pivot arm and a handlebar element on the pivot arm. The handlebar element is preferably substantially straight, and it includes a pair of hand gripping portions which are adapted to be grasped by the hands of an operator and positioned so that they are spaced forwardly from both the pivot axis and the steering column axis. The means for resiliently resisting pivoting movement preferably comprises a downwardly extending compression arm on the pivot arm and a compressible spring which is mounted so that it is compressed by the compression arm when a pivoting force is applied to the pivot arm. The compressible spring is preferably made of a resiliently compressible rubberized material, and the handlebar assembly preferably further comprises means for precompressing the compressible spring by a predetermined amount in order to adjust the resiliency thereof. The hand gripping portions of the handlebar element are preferably spaced forwardly from the pivot axis by an amount which is greater than the distance from the pivot axis to the compressible spring so that an amplification effect is achieved between the movement of the gripping portions of the handlebar element and the force applied to the compressible spring. The means for mounting the pivot arm preferably comprises a pair of spaced, tubular, resilient, low-friction, synthetic polymer bushings which are nonrotatably secured to the column member, and a pivot shaft which is received in an interference fit in the bushings and positioned in alignment with the pivot axis and in substantially perpendicular relation to the steering column axis. The pivot arm is preferably attached to the pivot shaft so that it rotates therewith as the pivot arm is pivoted.

It has been found that the handlebar assembly of the instant invention is effectively adapted to position the hands of an operator so that they are located forward of the steering column axis of a cycle and to nevertheless cushion shocks caused by bumps or the like in an irregular roadway or off-road surface. Specifically, because the hands of an operator of a cycle incorporating the handlebar assembly are positioned forward of the steering column axis of the cycle, shocks resulting from bumps cause the pivot arm to be pivoted relative to the cycle. As the pivot arm is pivoted, the compression arm resiliently compresses the compressible spring so that the effects of the shocks on the operator are minimized.

Accordingly, it is a primary object of the instant invention to provide an effective cushioned handlebar assembly for a cycle wherein the hands of an operator are positioned forward of the steering column axis.

Another object of the instant invention is to provide an effective bearing assembly for a pivoting handlebar assembly.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
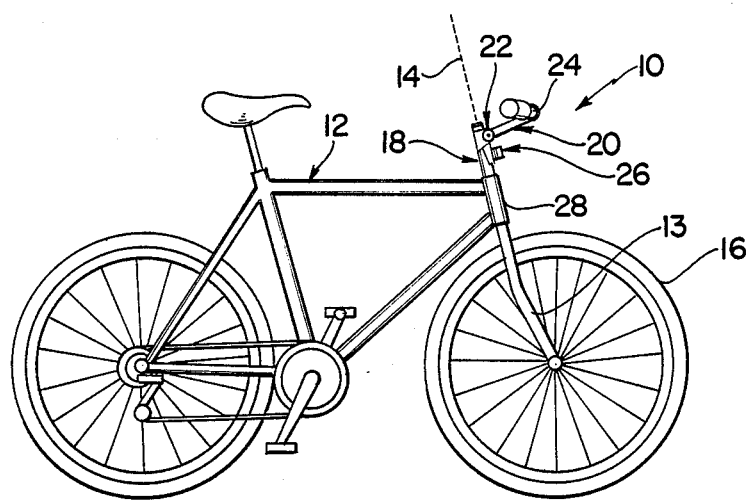
FIG. 1 is a side elevational view of a bicycle which includes the handlebar assembly of the instant invention.

Referring now to the drawings, the handlebar assembly of the instant invention is illustrated and generally indicated at 10 in FIGS. 1–5. As illustrated, the handlebar assembly 10 is adapted for use in connection with a bicycle 12 having a front fork 13 which is rotatable about a steering column axis 14 for turning a front wheel assembly 16, and it comprises a column member 18, a pivot arm 20, a pivot arm mounting assembly generally indicated at 22, a handlebar element 24 and a resilient spring assembly generally indicated at 26. The handlebar assembly 10 is mounted on the bicycle 12 so that the column member 18 is connected to the front fork 13, and so that it is rotatable therewith about the axis 14 in a column sleeve 28. The pivot arm 20 is pivotably attached to the column member 18 with the mounting assembly 22 so that the pivot arm 20 is pivotable about an axis 23 and extends forwardly from the column member 18, and the handlebar element 24 is attached to the forward end of the pivot arm 20. The resilient spring assembly 26 is operative for resiliently resisting pivoting movement of the pivot arm 20; and, as a result, it is operative for cushioning shocks which are transmitted to the column member 18 from the front wheel assembly 16.

The column member 18 comprises an elongated tubular shaft 32 having a retaining ring 34 received in the upper end thereof, and an angular lower retaining piece 36. The column member 32 has a bevelled or angular lower end face 38, and the retaining piece 36 is secured to the lower end of the tubular shaft 32 with an elongated bolt 39 which is received in threaded engagement in a threaded bore (not shown) in the retaining piece 36. As a result, by tightening the bolt 39, the retaining piece 36 can be advanced upwardly along the end face 38 so that it is moved into an axially offset position relative to the tubular shaft 32. The retaining piece 36 and the lower end portion of the tubular shaft 32 are received in a tubular member (not shown) at the upper end of the front fork 13, and secured therein by tightening the bolt 39 to wedge the retaining piece 36 and the lower end portion of the shaft 32 against the inner wall of the tubular member.

The pivot arm 20 comprises an elongated tubular main portion 40, a tubular rear sleeve 42, and a contractable tubular front sleeve 44. The front and rear sleeves 42 and 44, respectively, are welded to the main portion 40 in substantially perpendicular relation so that the sleeves 42 and 44 are disposed in substantially parallel relation.

The pivot arm mounting assembly 22 is operative for mounting the pivot arm 20 on the column member 18 so that the pivot arm 20 extends forwardly from the column member 18 and so that it is pivotable about a pivot axis which is substantially perpendicular to the steering column axis 14. The pivot arm mounting assembly 22 comprises a yoke assembly 46 which is welded to the tubular shaft 32, and it includes a pair of spaced, forwardly extending leaves 48 having aligned holes 50 therein. The mounting assembly 18 further comprises a pair of slightly resilient tubular bushings 52 which are received in the opposite end portions of the sleeve 42 of the pivot arm 20 and an internally threaded tubular shaft 54 which is received in an interference fit in the bushings 52. The bushings 52 are preferably made of a low-friction, slightly resilient, synthetic polyester material, such as DELRAN (DuPont TM), having a flexual modulous of between 350,000 psi and 430,000 psi and a coefficient of friction of between 0.15 and 0.35. The shaft 54 is received in the bushings 52 with an interference fit of between approximately 0.0002 inches and 0.002 inches (preferably approximately 0.0010) so that it is firmly retained therein; although, because of the physical properties of the materials from which the bushings 52 are constructed, the shaft 54 is nevertheless rotatable therein. The sleeve 42 with the bushings 52 and the shaft 54 therein is received between the leaves 48, and the retention collars 56 are press-fit into the opposite ends of the shaft 54 and secured with screws 58 which are received in threaded engagement in the shaft 54. Accordingly, when the pivot arm 40 is pivoted, the bushings 52 rotate on the shaft 54 while the shaft 54, the retention collars 56, and the screws 58 remain stationary.

The handlebar element 24 comprises a tubular main portion 60 and a pair of gripping portions 62. The tubular main portion 60 is received and secured in the tubular front sleeve 44 so that it extends outwardly on opposite sides of the pivot arm 20, and then rearwardly slightly at bends 64, terminating in the gripping portions 62. In this connection, it is important to note that the handlebar element 24 is constructed and mounted so that the gripping portions 64 are spaced forwardly from both the steering column axis 14 and the axis of the pivot shaft 54 so that a downward pivoting force on the gripping portion 62 causes the pivot arm 20 to be pivoted downwardly, and an upward force causes it to be pivoted upwardly.

Figure 2:
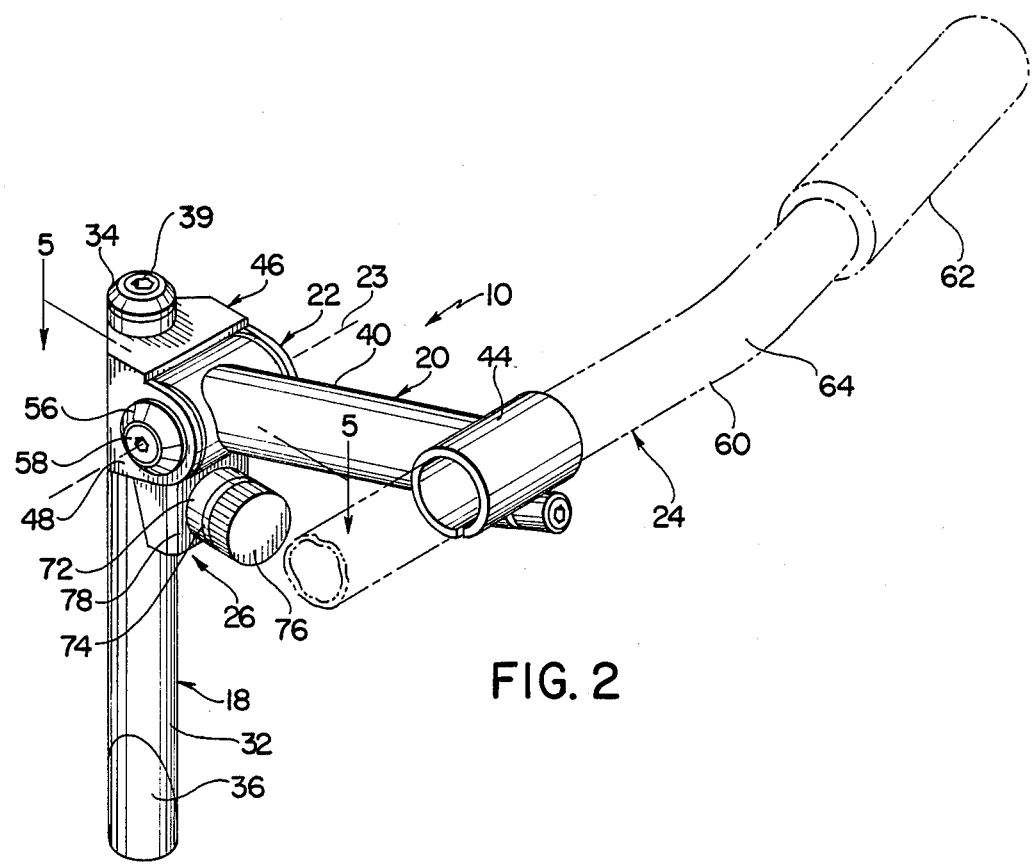
FIG. 2 is a fragmentary perspective view of the handlebar assembly per se.
Figure 3:
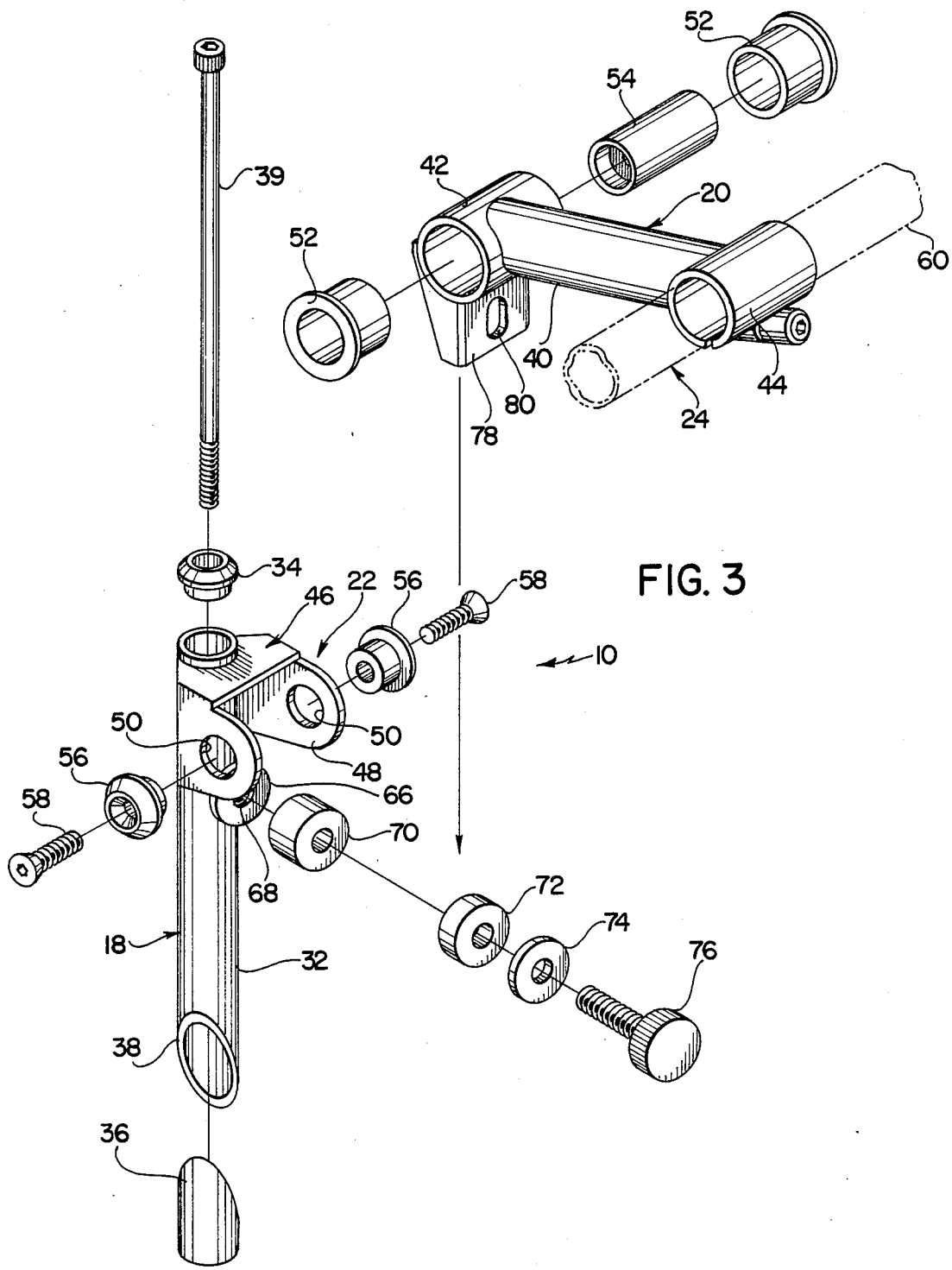
FIG. 3 is an exploded perspective view thereof.
Figure 4:
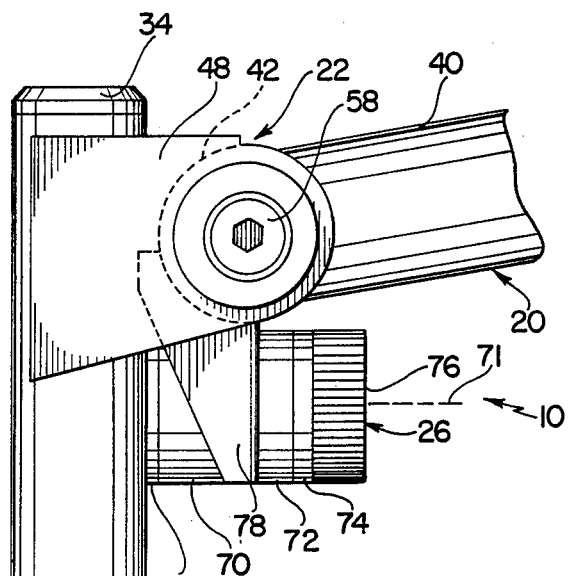
FIG. 4 is a fragmentary, side elevational view of the handlebar assembly.
Figure 5:
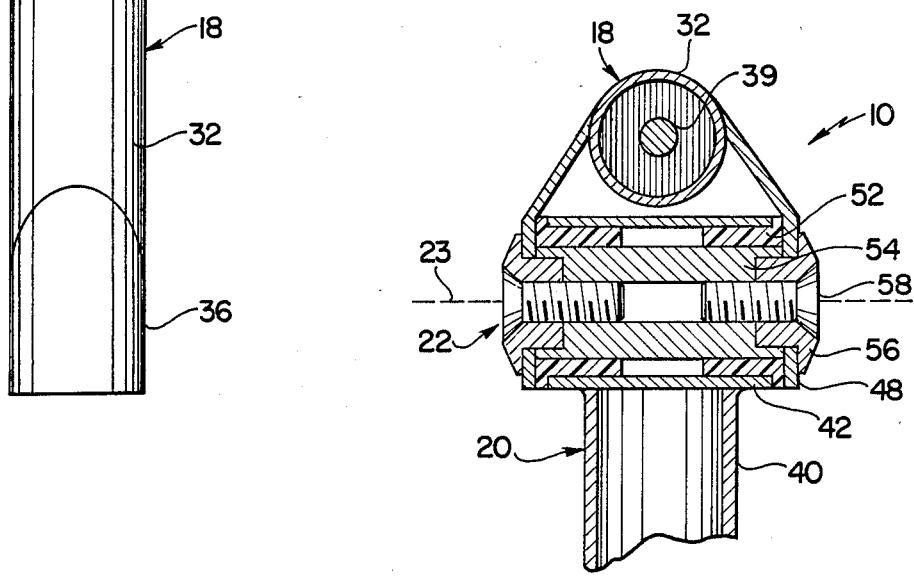
FIG. 5 is a sectional view taken along line 5—5 in FIG. 2.

The resilient spring assembly 26 is illustrated most clearly in FIGS. 2, 3 and 4, and it comprises a forwardly facing, circular backing plate 66 having a threaded aperture 68 therein which is welded to the column member 18, an inner rubber spring element 70 having an axis 71, an outer rubber spring element 72, a washer 74 and a tension screw 76. The spring biasing assembly 26 further comprises a downwardly extending compression arm 78 which is welded to the tubular sleeve 42 and has a vertically elongated hole 80 therethrough. The inner spring element 70 is assembled between the arms 78 and the backing plate 66, and the outer spring element 72 and the washer 74 are assembled in front of the arm 78. The screw 76 extends through the washer 74, the outer spring element 72, the hole 80 and the inner spring element 70, and it is received in threaded engagement in the bore 68. Accordingly, by adjusting the tension on the screw 76, the spring elements 70 and 72 can be precompressed by predetermined amounts to adjust the resiliencies thereof. In any event, when the pivot arm 40 is pivoted downwardly, the inner spring element 70 is axially compressed between the compression arm 78 and the backing plate 66; whereas when the pivot arm 40 is pivoted upwardly, the outer spring element 72 is compressed between the compression arm 78 and the washer 74. The compression arm 78 is preferably dimensioned so that the distance from the axis of the pivot shaft 54 to the axis of the screw 76 is less than the distance by which the gripping portions 62 of the handlebar element 24 are spaced forwardly from the axis of the pivot shaft 54 so that the effect of a pivoting force on the handlebar element 24 is amplified as it is applied to compress either the spring element 70 or the spring element 72. In any case, when a downward force is applied to the handlebar element 24 which is sufficient to overcome both the frictional resistance between the bearings or bushings 52 and the shaft 54 and the resisting force of the spring assembly 26, the shaft 54 is rotated in a first direction in the bushing 52 from a normal at-rest position to a rotated position and the shaft 54 is rotated in an opposite second direction in the bushings 52 to return it to the at-rest position thereof when the downward force is removed.

The handlebar assembly 10 is adapted to position the hands of a rider so that they are located forward of the steering column axis 14, and it is operative for absorbing shocks which are transmitted to the column member 18 as the bicycle 12 encounters bumps in an irregular roadway or off-road surface. As a result, not only is the weight of the rider moved forwardly over the front wheel assembly 16 so that the rider can more aggressively maneuver the bicycle 12, but shocks transmitted to the column member 18 when the front wheel assembly 16 encounters bumps in an irregular roadway or off-road surface are at least partially cushioned by the spring assembly 26. Further, because the pivot shaft 54 is mounted with an interference fit in the resilient bushings 52, the handlebar element 24 is firmly mounted in the handlebar assembly 10 even though it is downwardly pivotable with the pivot arm 20. Accordingly, for these reasons, as well as the other reasons hereinabove set forth, it is seen that the handlebar assembly of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A handlebar assembly for use in connection with a cycle having a steering column axis, said handle bar assembly comprising:
   a. a column member adapted to be rotatably mounted on said cycle so that said column member is disposed in substantially coaxial relation with said steering column axis;
   b. a pivot arm;
   c. means for mounting said pivot arm on said column member so that said pivot arm extends forwardly therefrom, and so that said pivot arm is downwardly pivotable about a pivot axis which is substantially perpendicular to said steering column axis;
   d. a handlebar element mounted on said pivot arm at a location which is spaced forwardly from said pivot axis, said handlebar element including a pair of hand gripping portions which are adapted to be grasped by the hands of an operator of said cycle, said hand gripping portions being spaced forwardly from both said pivot axis and said steering column axis; and
   e. means for resiliently resisting pivoting movement of said pivot arm comprising a downwardly extending compression arm on said pivot arm and inner compressible spring means interposed between said compression arm and said column member, said inner compressible spring means resiliently resisting movement of said compression arm toward said column member to resiliently resist downward pivoting movement of said pivot arm.

2. In the handlebar assembly of claim 1, said inner compressible spring means comprising a resiliently compressible rubberized spring member.

3. The handlebar assembly of claim 1 further comprising means for adjusting the resiliency of said compressible spring means.

4. The handlebar assembly of claim 1 further comprising means for precompressing said compressible spring means by a predetermined amount in order to adjust the resiliency of said compressible spring means.

5. In the handlebar assembly of claim 1, said pivot arm mounting means comprising a pivot shaft and at least one resilient, tubular, synthetic polymer bearing, said pivot shaft being received in an interference fit in said bearing and being rotatable therein.

6. In the handlebar assembly of claim 5, said mounting means further characterized as comprising a spaced pair of said tubular bearings on said pivot shaft.

7. In the handlebar assembly of claim 6, said bearings being non-rotatably secured to said column member.

8. In the handlebar assembly of claim 1, said spring means being compressible along an axis, said hand gripping portions being spaced forwardly from said column member axis by an amount which is greater than the distance from said pivot arm to the axis of said spring means.

9. A handlebar assembly for use in connection with a cycle having a steering column axis, said handlebar assembly comprising:
   a. a column member adapted to be rotatably mounted on said cycle so that said column member is disposed in substantially coaxial relation with said steering column axis;
   b. a handlebar element; and
   c. means mounting said handlebar element on said column member so that said handlebar element is pivotable from a normal at-rest position about an axis which is substantially perpendicular to said steering column axis, said mounting means including a pivot shaft and at least one resilient, tubular, synthetic polymer bearing, said bearing having a flexual modulus of between approximately 350,000 psi and 430,000 psi and a coefficient of friction of between approximately 0.15 and 0.35, said pivot shaft being received in an interference fit in said bearing of between approximately 0.0002 inches and 0.002 inches and being rotatable therein for pivoting said handlebar element; and
   d. resilient means resiliently resisting pivoting movement of said handlebar element;
   e. said shaft being rotatable in a first direction in said bearing for pivoting said handlebar element downwardly from said normal at-rest position thereof upon the application of a sufficient pivoting force to said handlebar element to overcome both the frictional resistance between said bearing and said shaft and the resisting force of said resilient means, said resilient means returning said handlebar element to the normal at-rest position thereof by rotating said shaft in an opposite second direction in said bearing upon the elimination of said pivoting force.

10. In the handlebar assembly of claim 9, said means for resiliently resisting pivoting movement comprising a downwardly extending compression arm on said pivot arm and inner compressible spring means interposed between said compression arm and said column member, said inner compressible spring means resiliently resisting movement of said compression arm toward said column member to resiliently resist downward pivoting movement of said pivot arm.

11. In the handlebar assembly of claim 10, said inner compressible spring means comprising a resiliently compressible rubberized spring member.

12. The handlebar assembly of claim 10 further comprising means for adjusting the resilience of said compressible spring means.

13. The handlebar assembly of claim 10 further comprising means for precompressing said compressible spring means by a predetermined amount in order to adjust the resiliency of said compressible spring means.

14. In the handlebar assembly of claim 9, said mounting means further characterized as comprising a spaced pair of said tubular bearings on said pivot shaft.

15. In the handlebar assembly of claim 14, said bearings being non-rotatably secured to said column member.

16. In the handlebar assembly of claim 10, said spring means being compressible along an axis, said hand gripping portions being spaced forwardly from said column member axis by an amount which is greater than the distance from said pivot arm to the axis of said spring means.

17. A handlebar assembly for use in connection with a cycle having a steering column axis, said handlebar assembly comprising:
   a. a column member adapted to be rotatably mounted on said cycle so that said column member is disposed in substantially coaxial relation with said steering column axis;
   b. a pivot arm;
   c. means for mounting said pivot arm on said column member so that said pivot arm extends forwardly therefrom, and so that said pivot arm is downwardly pivotable from a normal at-rest position about a pivot axis which is substantially perpendicular to said steering column axis, said pivot arm mounting means comprising a pivot shaft and at least one resilient, tubular, synthetic polymer bearing, said bearing having a flexual modulus of between approximately 350,000 psi and 430,000 psi and a coefficient of friction of between approximately 0.15 and 0.35, said shaft being received in an interference fit in said bearing of between approximately 0.0002 inches and 0.002 inches;
   d. a handlebar element mounted on said pivot arm at a location which is spaced forwardly from said pivot axis, said handlebar element including a pair of handgripping portions which are adapted to be grasped by the hands of an operator of said cycle, said hand gripping portions being spaced forwardly from both said pivot axis and said steering column axis;. and
   e. resilient means for resiliently resisting pivoting movement of said pivot arm;
   f. said shaft being rotatable in a first direction in said bearing for pivoting said pivot arm downwardly from said normal at-rest position thereof upon the application of a sufficient downward force to said pivot arm to overcome both the frictional resistance between said bearing and said shaft and the resisting force of said resilient means, said resilient means returning said pivot arm to the normal at-rest position thereof by rotating said shaft in an opposite second direction in said bearing upon the elimination of said downward force.

18. In the handlebar assembly of claim 17, said means for resiliently resisting pivoting movement comprising a downwardly extending compression arm on said pivot arm and inner compressible spring means interposed between said compression arm and said column member, said inner compressible spring means resiliently resisting movement of said compression arm toward said column member to resiliently resist downward pivoting movement of said pivot arm.

19. In the handlebar assembly of claim 18, said inner compressible spring means comprising a resiliently compressible rubberized spring member.

20. The handlebar assembly of claim 18 further comprising means for adjusting the resiliency of said compressible spring means.

21. The handlebar assembly of claim 18 further comprising means for precompressing said compressible spring means by a predetermined amount in order to adjust the resiliency of said compressible spring means.

22. In the handlebar assembly of claim 18, said spring means being compressible along an axis, said hand gripping portions being spaced forwardly from said column member axis by an amount which is greater than the distance from said pivot arm to the axis of said spring means.

23. In the handlebar assembly of claim 17, said mounting means further characterized as comprising a spaced pair of said tubular bearings on said pivot shaft.

24. In the handlebar assembly of claim 23, said bearings being non-rotatably secured to said column member.

* * * * *